United States Patent

Su

[11] Patent Number: 6,061,500
[45] Date of Patent: May 9, 2000

[54] ELECTRONIC HEATER FOR AN AQUARIUM

[76] Inventor: Wen-Hong Su, No. 85, Ching-Ann St., Tue-Cheng City, Taipei Hsien, Taiwan

[21] Appl. No.: 09/113,362

[22] Filed: Jul. 10, 1998

[51] Int. Cl.⁷ .............................. H05B 1/02; H05B 3/06; A01K 63/04
[52] U.S. Cl. .......................... 392/498; 219/523; 119/262
[58] Field of Search ................................... 392/497, 498; 119/73, 262; 219/437, 510, 523

[56] References Cited

U.S. PATENT DOCUMENTS

| | | | |
|---|---|---|---|
| 3,564,589 | 2/1971 | Arak | 392/498 |
| 4,327,281 | 4/1982 | Jager et al. | 219/523 |
| 4,812,626 | 3/1989 | Strada | 219/523 |
| 4,983,813 | 1/1991 | Van Tulleken et al. | 219/523 |
| 5,020,128 | 5/1991 | Bleckmann | 392/498 |
| 5,113,057 | 5/1992 | Tsai | 219/523 |
| 5,568,587 | 10/1996 | Marioni | 392/498 |
| 5,834,741 | 11/1998 | Tseng | 219/506 |
| 5,905,849 | 5/1999 | Ito | 392/498 |

*Primary Examiner*—Teresa Walberg
*Assistant Examiner*—Daniel Robinson
*Attorney, Agent, or Firm*—Bacon & Thomas

[57] ABSTRACT

An electronic heater structure includes a tube body, a heating wire disposed on the bottom of the interior of the tube body and a temperature controlling circuit. The temperature controlling circuit employs a thermosensitive resistor for detecting the temperature and controlling the activation time of the heating wire. The temperature controlling circuit employs a relay for controlling whether the heating wire is powered on or off. An upper cap of the tube body is integrally formed with a projecting chamber for placing a thermosensitive resistor therein. The relay and the thermosensitive resistor are isolated from each other by a circuit board. The tube body is vacuumized to remove the thermoconductive medium therein. Except for the heating wire, the temperature controlling circuit itself will not generate high heat and emit electro-magnetic interference and the detection portion with the thermosensitive resistor can extend into the water to accurately detect the water temperature.

5 Claims, 7 Drawing Sheets

ELECTRONIC HEATER FOR AN AQUARIUM

BACKGROUND OF THE INVENTION

The present invention relates to a heater structure for an aquarium, and more particularly to an electronic heater structure in which the temperature controlling circuit is integrated and received in the tube body. Except the heating wire, the temperature controlling circuit itself will not generate high heat and emit electro-magnetic interference so that the water temperature can be accurately detected.

A conventional aquarium heating tube includes a glass tube in which an alloy heating wire and a controlling circuit are enclosed. The opening of the glass tube is watertightly sealed by a cap. The controlling circuit includes a bimetal plate. An adjustment rod abuts against a bending section of the bimetal plate so that in the case that the water temperature is too low, the contacts of the bimetal plate engage each other to power on the heating wire and adjust the water temperature. When the water temperature reaches a certain value, the contacts jump apart to cut off the power so as to maintain the temperature within a substantially constant range. Such structure employs mechanical thermal expansion and contraction properties to achieve the temperature control so that the temperature controlling effect has a great error up to 1 to 2° C. In use, the adjustment rod must be frequently adjusted and aligned. Such heating tube has poor quality and low price.

FIG. 6 shows an electronic heating tube in which an electronic measure is used to control and adjust the temperature. The accuracy of the temperature controlling can reach 0.3° C. so that once rectified, the temperature of the aquarium can be reliably maintained in a constant state. In use, it is unnecessary to frequently adjust the adjustment rod. Such heating tube has good quality. However, such structure still has some shortcomings as follows:

1. In such electronic temperature controlling circuit, the adjustment is achieved by a TRIAC transistor which will generate a noise when powered on. The noise will cause EMI interference with general electric appliances.
2. The electronic temperature controlling circuit has a large volume and thus can hardly be received in the tube. The controlling part must be fixed outside the tube in a separate housing connected to the tube via a wire. Therefore, the adjustment cannot be performed conveniently as adjustment of the traditional heating tube.
3. The temperature detection is achieved by a thermosensitive resistor and the silicon controlling elements will generate heat themselves. Therefore, in the case that they are sealed in the tube together with the thermosensitive resistor, a serious error in temperature sensing will take place to affect the accuracy of the temperature controlling. Therefore, in order to achieve better accuracy of temperature controlling, the temperature detection parts are fixed outside the tube and connected to the tube via a wire.

In addition, FIG. 7 shows another electronic heating tube in which the thermosensitive resistors are sealed in the upper cap to save cost and facilitate processing. However, the heating tube is not equipped with good isolation measure so that the heat generated by the heating wire will affect the accuracy of the thermosensitive resistors via radiation and air convection. Therefore, error will inevitably take place. Moreover, the projecting chamber disposed on the cap actually is not free from the wrapping of the plastic material of the cap and can hardly effectively get close to the water level. Therefore, it is impossible to achieve an accurate temperature controlling effect.

SUMMARY OF THE INVENTION

It is a primary object of the present invention to provide an electronic heater structure in which the controlling circuit is integrated and directly installed in the tube body. It is thus not necessary to conduct wires outside the tube body and no interference with the electric appliances will take place.

It is a further object of the present invention to provide the above electronic heater structure in which the detection part is sealedly installed in the tube body so as to accurately detect the water temperature and avoid mis-operation resulting from the heat generated by the heating wire.

It is still a further object of the present invention to provide the above electronic heater structure to which a scale-indicating adjustment structure is added.

According to the above objects, the electronic heater structure includes a tube body, a heating wire disposed on the bottom of the interior of the tube body and a temperature controlling circuit. The temperature controlling circuit employs a thermosensitive resistor for detecting the temperature and controlling the activation time of the heating wire. The temperature controlling circuit employs a relay for controlling whether the heating wire is powered on or off. An upper cap of the tube body is integrally formed with a projecting chamber for placing a thermosensitive resistor therein. The relay and the thermosensitive resistor are isolated from each other by a circuit board. The tube body is vacuumized to remove the thermoconductive medium therein. Except the heating wire, the temperature controlling circuit itself will not generate high heat and emit electromagnetic interference and the detection portion with the thermosensitive resistor can extend into the water to accurately detect the water temperature.

The present invention can be best understood through the following description and accompanying drawings, wherein:

DETAILED DESCRIPTION OF THE PREFERRED EMBODIMENTS

Figure 1:
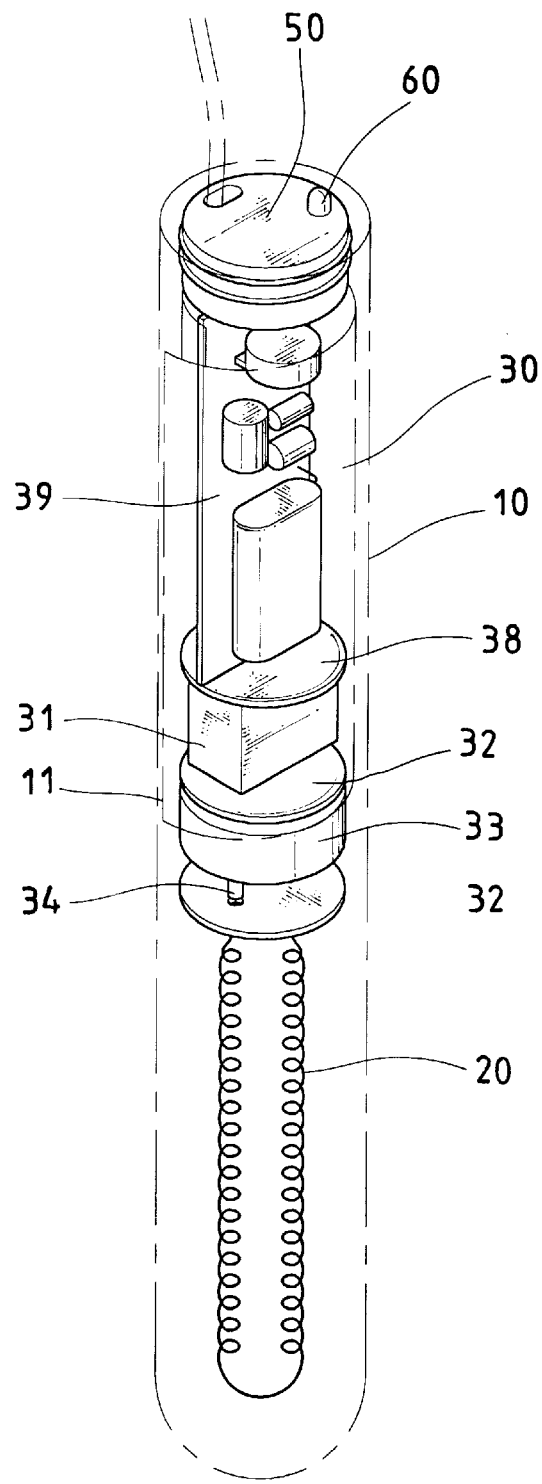
FIG. 1 is a perspective assembled view of the present invention.
Figure 2:
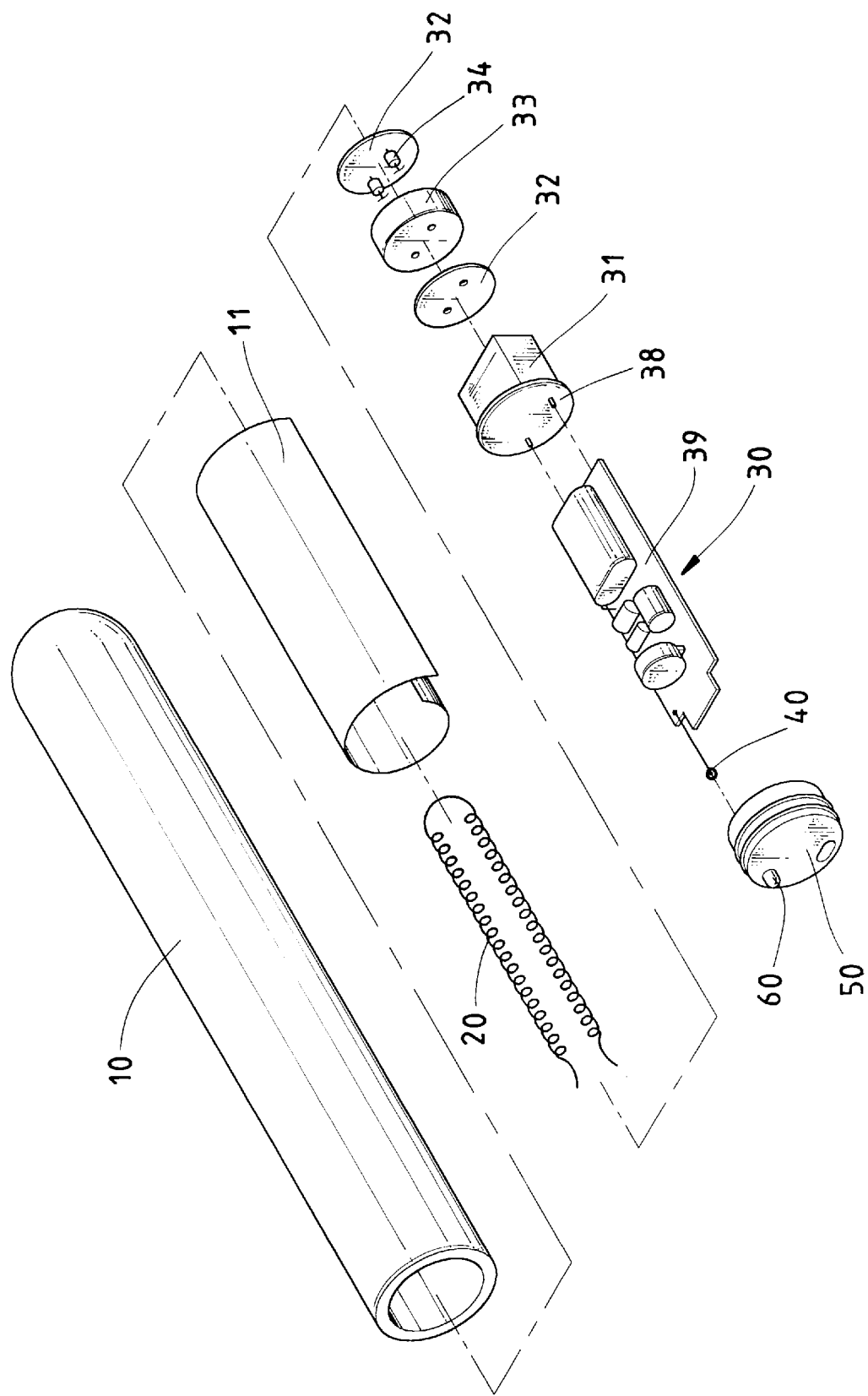
FIG. 2 is a perspective disassembled view of a part of the present invention.

Please refer to FIGS. 1 and 2. The heater structure of the present invention includes a tube body 10, a heating wire 20 disposed on the bottom of the interior of the tube body 10 and a temperature controlling circuit 30. The circuit 30 employs a thermosensitive resistor 40 for detecting the temperature and controlling the activation time of the heating wire 20. In order to achieve a better appearance, all the components are enclosed by a heat-resistant paper 11 with a window for exposing only a part of the heating wire 20. The heat-resistant paper can be printed with characters or pictures.

The temperature controlling circuit 30 employs a relay 31 for controlling whether the heating wire 20 is powered on or off. The upper cap 50 of the tube body 10 is integrally formed with a projecting chamber 60 for placing the thermosensitive resistor 40 therein. Mica plates 32 and high temperature-resistant insulator 33 are disposed at the lower end of the relay 31 for isolating the heating wire 20 therebelow. The connecting terminal 34 is disposed therebetween. The thermosensitive resistor 40 at the upper end detects the temperature to control the relay 31 for controlling the activation time of the heating wire 20. Therefore, except the heating wire 20, the temperature controlling circuit 30 itself will not generate high heat and emit electro-magnetic interference.

The circuit is minimized by way of surface mount technology (SMT) so as to be hidden in the tube body 10. The relay 31 and the thermosensitive resistor 40 are isolated from each other by a circuit board 39 as an upper and a lower end so as to prevent the coil of the relay 31 from generating heat to affect the thermosensitive resistor 40 and lead to error of temperature detection. When assembled, the relay 31 is positioned at the lowermost position of the circuit board 39 and retained by another transverse small circuit board 38. The two lateral boards supporting the relay 31 are disposed with through holes for connecting the lower heating wire 20.

Figure 3:
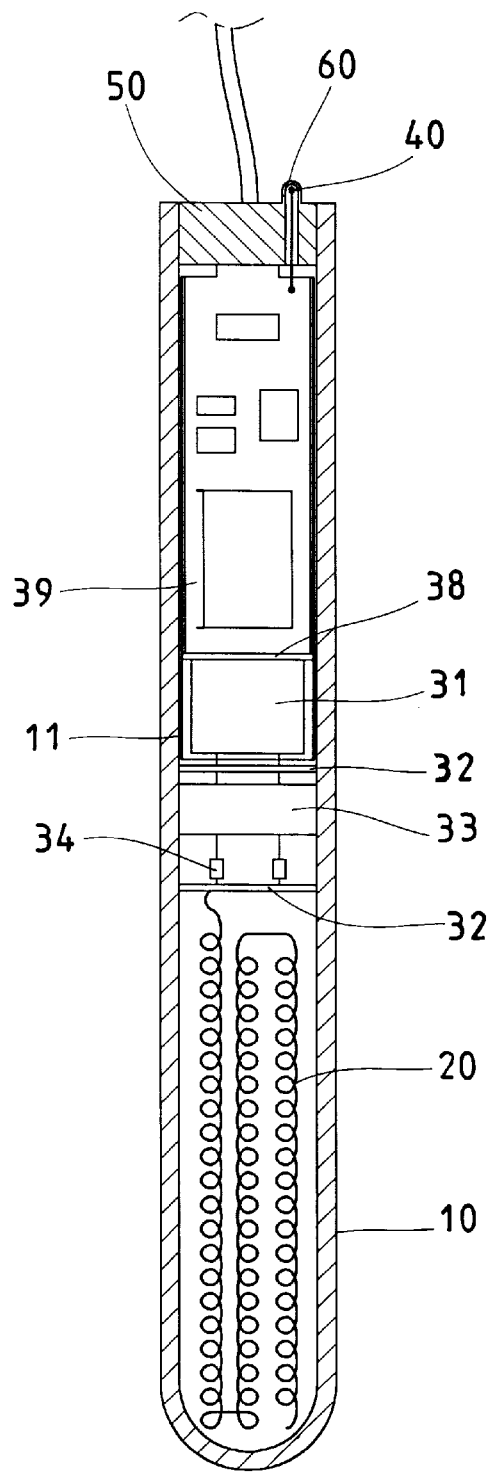
FIG. 3 is a sectional assembled view of the present invention.
Figure 4:
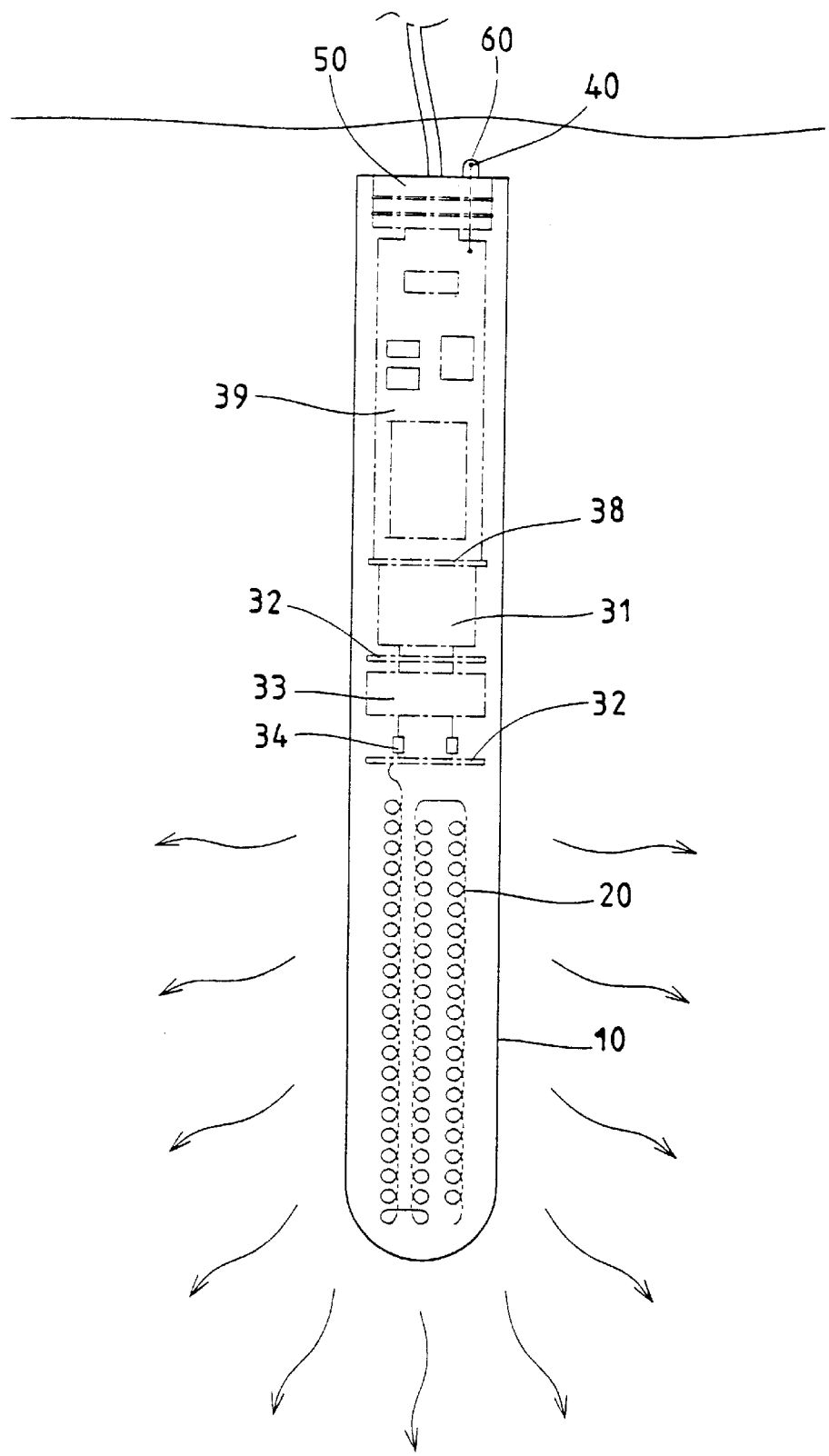
FIG. 4 shows the manner in which the heater structure of the present invention is placed and used in an aquarium.

In addition, as shown in FIG. 3, the projecting chamber 60 of the upper cap 50 is formed by thin material extending from the cap body and made of plastic material. Therefore, after the thermosensitive resistor 40 is placed inside the sensing portion projects upwardly to separate from the solid wrapping cover range of the upper cap 50. Therefore, in application, as shown in FIG. 4, the projecting chamber 60 extends into the water to accurately detect the water temperature change so as to accurately control the activation of the heating wire. It should be noted that the entire design is that the relay 31 is used to control the activation time of the heating wire 20 so that, except the heating wire 20 the temperature controlling circuit 30 itself will not generate high heat and emit electro-magnetic interference. Moreover, the relay 31 and the thermosensitive resistor 40 are clearly isolated so that no error of temperature detection will take place.

Referring to FIG. 3, in manufacturing, the tube body 10 is vacuumized to remove the thermoconductive medium therein so that the powered on heating wire 51 will only affect the thermosensitive resistor 22 by radiated heat without any conducted heat. Therefore, the effect on the thermosensitive resistor 40 due to the heat generated by the heating wire is minimized.

Figure 5:
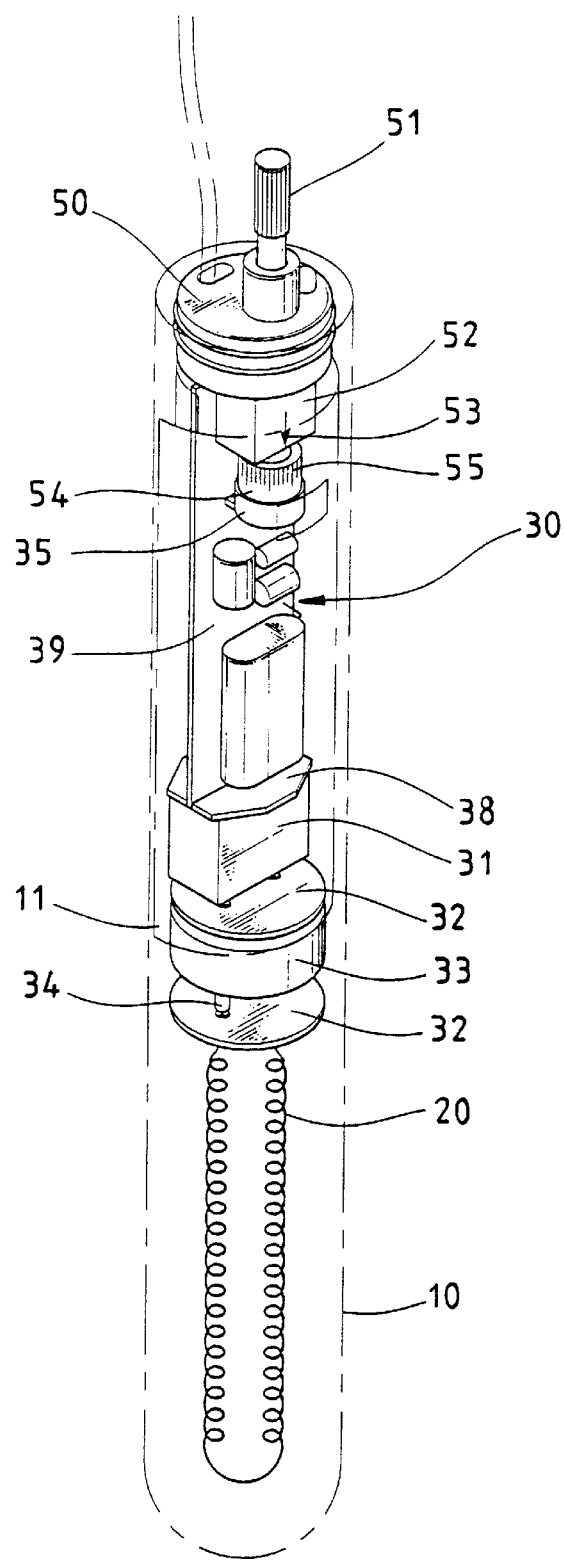
FIG. 5 shows that a scale-indicating adjustment structure is added to the heater structure of the present invention.
Figure 6:
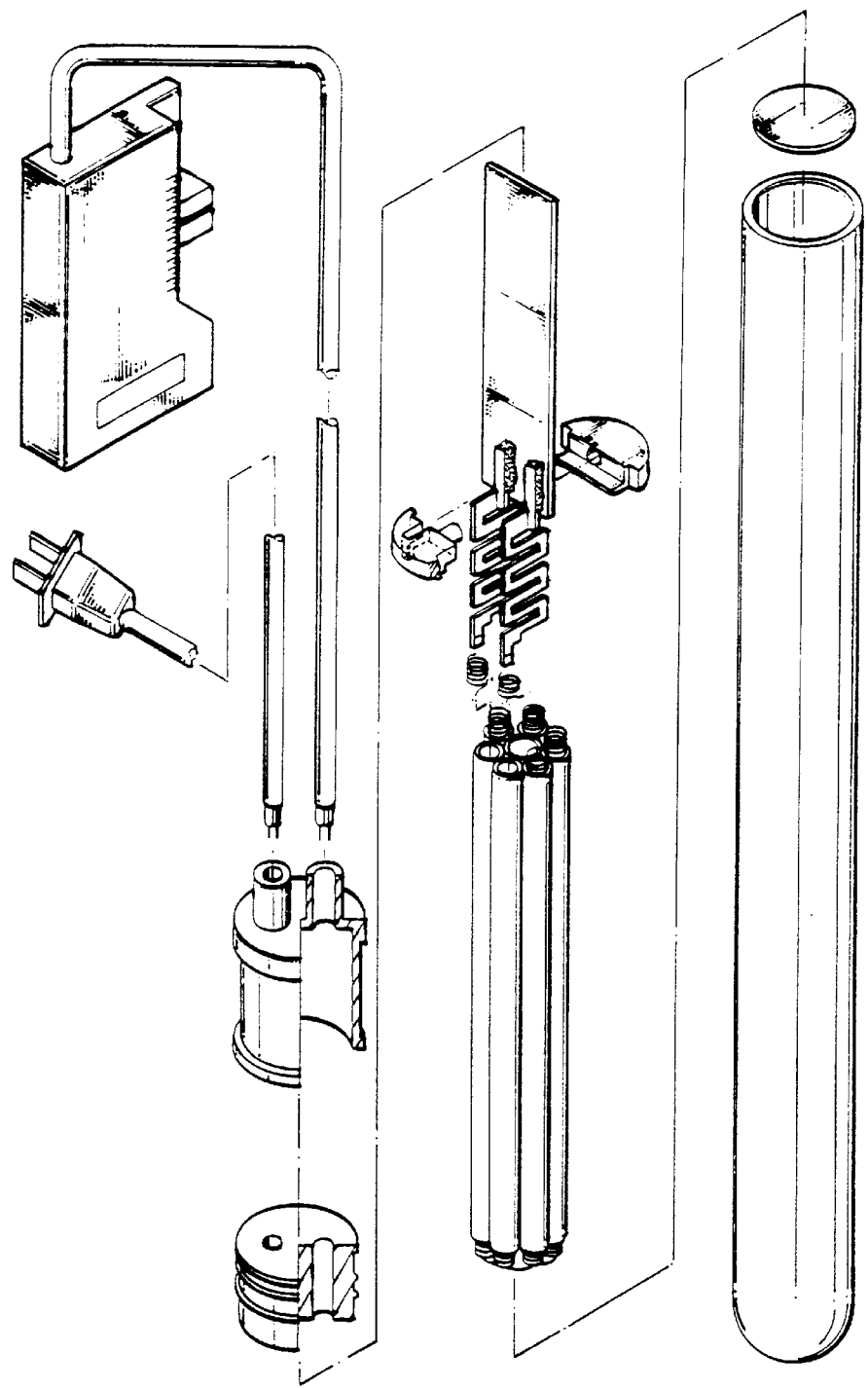
FIG. 6 shows a conventional electronic heater.
Figure 7:
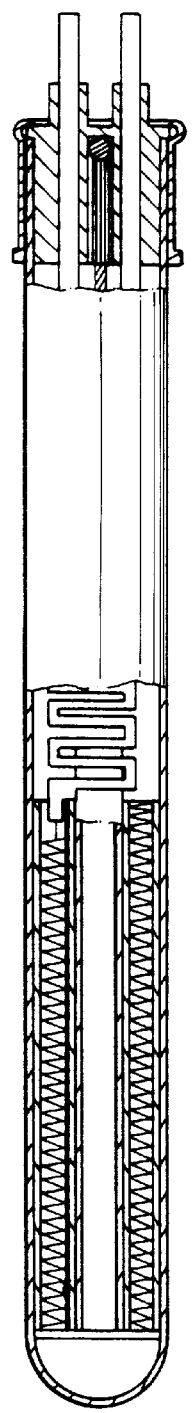
FIG. 7 shows another conventional electronic heater.

Referring to FIG. 5, an integral scale indicating adjustment structure is added to the electronic heating tube. The upper cap 50 is disposed with an adjustment rod 51 under which a variable resistor 35 of the temperature controlling circuit 30 is disposed. A fixing seat 52 is mounted under the upper cap for fixing the adjustment rod on the circuit board 39. The fixing seat is equipped with an indicator 53 for indicating a scale. A fitting ring is fitted with the variable resistor and adjustably rotatable therewith. The fitting ring is marked with scales on a circumference thereof. The scales marked on the fitting ring vary from 20 to 35 degrees. When the adjustment rod 51 is the fitting ring marked with scales also rotates. The indicator 53 point to a scale 55 on the fitting ring that is indicative of the amount by which the fitting ring has been rotated, and therefore of the proposed heating temperature of the heating wire activated by the relay controlled by the temperature controlling circuit.

According to the above arrangement, the accuracy of temperature sensing is greatly increased and the temperature can be indicated by the scale indicator. The temperature controlling, heating and scale indication components are all enclosed in the tube body so as to facilitate processing and application and reduce the manufacturing cost.

It should be noted that the above description and accompanying drawings are only used to illustrate some embodiments of the present invention, not intended to limit the scope thereof. Any modification of the embodiments should fall within the scope of the present invention.

What is claimed is:

1. An electronic heater structure comprising a tube body and a heating wire disposed on a bottom of the interior of the tube body and a temperature controlling circuit, the temperature controlling circuit including a thermosensitive resistor arranged to detect a temperature and to control an activation time of said heating wire, wherein the temperature controlling circuit employs a relay connected to said thermosensitive resistor and arranged to switch on and off in response to changes in resistance of said thermosensitive resistor for controlling whether the heating wire is powered on or off, and wherein an upper cap of the tube body is integrally formed with a projecting chamber in which is placed said thermosensitive resistor, and whereby except for the heating wire, the temperature controlling circuit itself will not generate high heat and emit electro-magnetic interference and the water temperature can be accurately detected wherein the relay and the thermosensitive resistor are isolated by a circuit board, a mica plate and a high temperature-resistant insulator.

2. An electronic heater structure as claimed in claim 1, wherein the relay is positioned at a lowermost position of a circuit board and retained by another transverse small circuit board, the two boards including through holes for connecting the temperature controlling circuit with the lower heating wire.

3. An electronic heater structure as claimed in claim 1, wherein the projecting chamber of the upper cap is formed by a thin plastic material extending from the cap body.

4. An electronic heater structure as claimed in claim 1, wherein the tube body is vacuumized to remove a thermoconductive medium therein.

5. An electronic heater structure as claimed in claim 1, wherein an adjustment rod is disposed in the upper cap, a variable resistor of the temperature controlling circuit is disposed under the adjustment rod, a fixing seat is mounted under the upper cap for fixing the adjustment rod on a circuit board for the temperature controlling circuit, and the fixing seat is equipped with an indicator for indicating a scale, a fitting ring being fitted with the variable resistor and adjustably rotatable therewith, the fitting ring being marked with scales on a circumference thereof, whereby when the adjustment rod is rotated to adjust the variable resistor, the scales on the fixing seat also rotate, and the indicator thereof indicates a scale of the fitting ring so as to show the temperature obtained by adjusting the variable resistor.

* * * * *